(12) United States Patent
Anguiano

(10) Patent No.: US 12,212,687 B2
(45) Date of Patent: Jan. 28, 2025

(54) METHODS AND SYSTEM FOR ISSUING AN ELECTRONIC SIGNATURE

(71) Applicant: J&A GARRIGUES, S.L.P., Madrid (ES)

(72) Inventor: José María Anguiano, Madrid (ES)

(73) Assignee: J&A GARRIGUES, S.L.P., Madrid (ES)

( * ) Notice: Subject to any disclaimer, the term of this patent is extended or adjusted under 35 U.S.C. 154(b) by 208 days.

(21) Appl. No.: 18/003,542

(22) PCT Filed: Jun. 21, 2021

(86) PCT No.: PCT/EP2021/066782
§ 371 (c)(1),
(2) Date: Dec. 28, 2022

(87) PCT Pub. No.: WO2022/002657
PCT Pub. Date: Jan. 6, 2022

(65) Prior Publication Data
US 2023/0246848 A1 Aug. 3, 2023

(30) Foreign Application Priority Data
Jun. 29, 2020 (EP) .................................... 20382574

(51) Int. Cl.
*H04L 9/32* (2006.01)
*H04L 9/06* (2006.01)
*H04L 9/08* (2006.01)

(52) U.S. Cl.
CPC .......... *H04L 9/3247* (2013.01); *H04L 9/0618* (2013.01); *H04L 9/0825* (2013.01)

(58) Field of Classification Search
CPC . H04L 9/06; H04L 9/0618; H04L 9/08; H04L 9/0816; H04L 9/0819; H04L 9/0825; H04L 9/32; H04L 9/3247; H04L 9/3255
See application file for complete search history.

(56) References Cited

U.S. PATENT DOCUMENTS

2002/0013898 A1 1/2002 Sudia et al.
2003/0120931 A1 6/2003 Hopkins et al.
(Continued)

FOREIGN PATENT DOCUMENTS

CN 111034114 A * 4/2020 ......... G06Q 20/3825
EP 1 235 135 A2 8/2002

OTHER PUBLICATIONS

International Search Report for PCT/EP2021/066782 dated Jul. 15, 2021.
Written Opinion for PCT/EP2021/066782 dated Jul. 15, 2021.

*Primary Examiner* — Boris D Grijalva Lobos
(74) *Attorney, Agent, or Firm* — Sughrue Mion, PLLC

(57) ABSTRACT

A method and a system for issuing an electronic signature. The method involves sending, by a first server, information including a plain text, a hash code an identification number and a phone number of the signer of an electronic document to a second server and to a plurality of autonomous computing nodes; generating, by each node, an asymmetric key using its private key; selecting one of the nodes as a main node; creating, by each node different to the main node, a file by extracting the information; creating a code sequence having a series of characters by digitally signing the plain text with the private key; and extracting at least one character of the created code sequence, providing a modified code sequence; generating, by the main node, a signature code by combining the modified code sequences provided by the other nodes; and transmitting the signature code to the second server.

10 Claims, 2 Drawing Sheets

(56) References Cited

U.S. PATENT DOCUMENTS

2021/0091934 A1\* 3/2021 Fletcher ................ H04L 9/3297
2022/0172180 A1\* 6/2022 Komiyama ............. G06F 21/64

\* cited by examiner

METHODS AND SYSTEM FOR ISSUING AN ELECTRONIC SIGNATURE

CROSS REFERENCE TO RELATED APPLICATIONS

This application is a National Stage of International Application No. PCT/EP2021/066782 filed Jun. 21, 2021, claiming priority based on European Patent Application No. 20382574.0 filed Jun. 29, 2020.

TECHNICAL FIELD

The present invention belongs to the field of secure electronic methods and systems. In particular, the invention relates to a method and system for issuing an electronic signature.

BACKGROUND OF THE INVENTION

Entities are often required to have all its digital transactions or documents authenticated via an effective electronic prove to guarantee the no manipulation thereof and in order to be used as evidence in a trial.

There are know some patents and patent applications in this field. US2002013898 discloses a multi-step signing system and method that use multiple signing devices to affix a single signature which can be verified using a single public verification key. Each signing device possesses a share of the signature key and affixes a partial signature in response to authorization from a plurality of authorizing agents. After a first partial signature has been affixed, a second signing device exponentiates the first partial signature. Each signing device can also affix a partial signature, and the plurality of partial signatures can be multiplied together to form the final signature. Security of the system is enhanced by distributing capability to affix signatures among a plurality of signing devices and by distributing authority us affix a partial signature among a plurality of authorizing agents.

US2003120931A1 provides a method for generating a group digital signature. Each of a group of individuals may sign a message M to create a group digital signature S, wherein M corresponds to a number representative of a message, $0<=M<=n-1$, n is a composite number formed from the product of a number k of distinct random prime factors $p1.p2 \ldots pk$, k is an integer greater than 2, and $S=Md(\bmod n)$. The method may include performing a first partial digital signature subtask on a message M using a first individual private key to produce a first partial digital signature S1; performing at least a second partial digital signature subtask on the message M using a second individual private key to produce a second partial digital signature S2; and combining the partial digital signature results to produce a group digital signature S.

EP1235135A2 discloses a distributed digital signature generation method that includes the steps of: generating partial signature keys by distributed processes, generating partial digital signatures by using the partial signature keys for the hash value of an input digital document to which additional information such as time is added, combining a predetermined threshold number of partial digital signatures, performing a transformation process on the partial digital signatures according to the combination, and generating an integrated digital signature from the result of the transformation process, in which a least common multiple of predetermined values is used as a transformation number, and it is judged whether an incorrect partial digital signature exists and the number is one, and the incorrect partial digital signature is identified when the number is one.

New methods and systems to certify electronic transactions in a digital environment with robust and effective evidence that can be brought to court and before industry regulators are needed.

SUMMARY OF THE INVENTION

Embodiments of the present invention provide according to a first aspect a method for issuing an electronic signature. The method comprises sending, by a first server, information to a second server and to a plurality of autonomous computing nodes of a network, the information including a plain text of an electronic document, a hash code and an identification number of the electronic document, and a phone number of the signer of the electronic document; generating, by each autonomous computing node, an asymmetric key using its private key, for instance using the RSA or the DHP algorithms, among others; selecting one of the plurality of autonomous computing nodes as a main autonomous computing node; creating, by each of the autonomous computing nodes different to said main autonomous computing node, a file of the information it receives by: extracting (part or all) the information; creating a code sequence comprising a series of characters by digitally signing the plain text with the private key; and extracting at least one character of said created code sequence, providing a modified code sequence; receiving, by the main autonomous computing node, the file created by the other autonomous computing nodes; generating, by the main autonomous computing node, a signature code by combining the modified code sequences provided by the other autonomous computing nodes; and transmitting the signature code to the second server, the latter further transmitting the signature code to the signer of the electronic document, whereby the signer can verify that its digital signature is correct by using the received signature code in a web page or software application, wherein upon validation of the digital signature the electronic document is deemed to be signed.

In an embodiment, the series of characters comprise alphanumeric characters.

In an embodiment, the at least one character that is extracted is the last character of the code sequence.

In some embodiments the extracting step can comprise extracting more than one character.

In an embodiment, the main autonomous computing node is randomly selected.

Alternatively, the selecting step comprises selecting the first or the last node of the plurality of autonomous computing nodes as the main autonomous computing node.

According to the proposed method, the signature code is transmitted via a sms, a Voice over IP messaging application or via an email.

Embodiments of the present invention also provide according to a second aspect a system for issuing an electronic signature. The system includes a first server (or first computer), a second server (or second computer), and a plurality of autonomous computing nodes of a network. The system can also include a user computing device such as a mobile phone, among others, that has associated or that comprises a phone number.

The system of the second aspect is configured to implement the method of the first aspect.

Therefore, the first server is adapted to send information including a plain text of an electronic document, a hash code and an identification number of the electronic document, and a phone number of the signer of the electronic document to the second server and to the autonomous computing nodes. Each autonomous computing node generates an asymmetric key using its private key. One of the autonomous computing nodes is the main autonomous computing node and the others are adapted to create a file of the information it receives by means of extracting the information; creating a code sequence comprising a series of characters by digitally signing the plain text with the private key; and extracting at least one character of said created code sequence, providing a modified code sequence, and to send the created file to the main autonomous computing node. The main autonomous computing node is adapted to generate a signature code by combining the modified code sequences provided by the other autonomous computing nodes, and to transmit the generated signature code to the second server, the latter being adapted to further transmit the signature code to the signer of the electronic document, whereby the signer can verify that its digital signature is correct via the cited user computing device and by means of using the received signature code in a web page or software application, wherein upon validation of the digital signature the electronic document is deemed to be signed.

In particular, the autonomous computing nodes are cloud autonomous computing nodes. The access to each autonomous computing node is performed by means of a notarial key.

BRIEF DESCRIPTION OF THE DRAWINGS

The accompanying drawings illustrate one or more example aspects of the present disclosure and, together with the detailed description, serve to explain their principles and implementations.

DETAILED DESCRIPTION OF SEVERAL EMBODIMENTS

Figure 1:
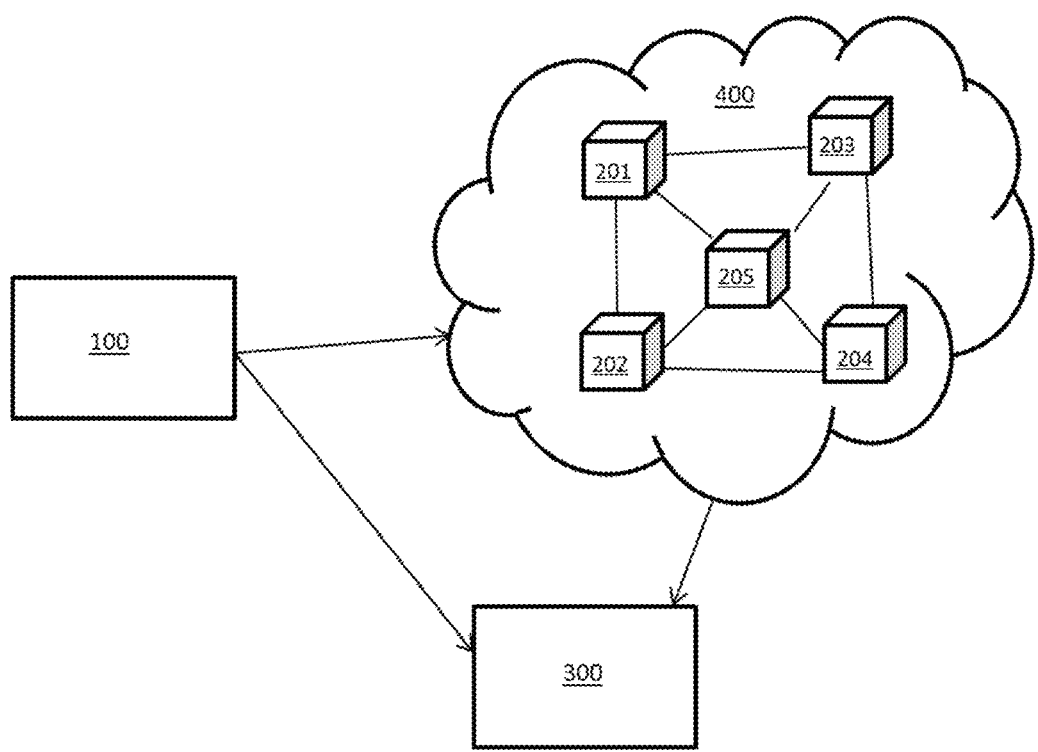
FIG. 1 illustrates a system for issuing an electronic signature, in accordance with one embodiment of the present invention.

FIG. 1 illustrates a system for issuing an electronic signature. The system of this embodiment has a server (or computer) 100, a set of autonomous computing nodes 201-205 of a network 400, and a server (or computer or Middleware) 300. Although not illustrated the system particularly also includes a user computer device, for example a mobile phone, among others such as a tablet or any other smart device that has associated or that comprises a phone number. The system can also include, not shown either, a web page or software application for the verification of a signature code.

The server 100 can be configured to communicate with each of the autonomous computing nodes 201-205 and with the second server 300. In particular said communication comprises the transmission of a plain text of an electronic document, a hash code and an identification number of the electronic document, and a phone number of the signer of the electronic document. The information can be transmitted to the nodes 201-205 and to the second server 300 either at the same time or at a different time. In some implementations, the information to each autonomous computing node 201-205 can be transmitted at a different time.

The signer of the electronic document can communicate with the second server 200 via the cited user computer device.

The autonomous computing nodes 201-205 can be cloud-based computing nodes.

Figure 2:
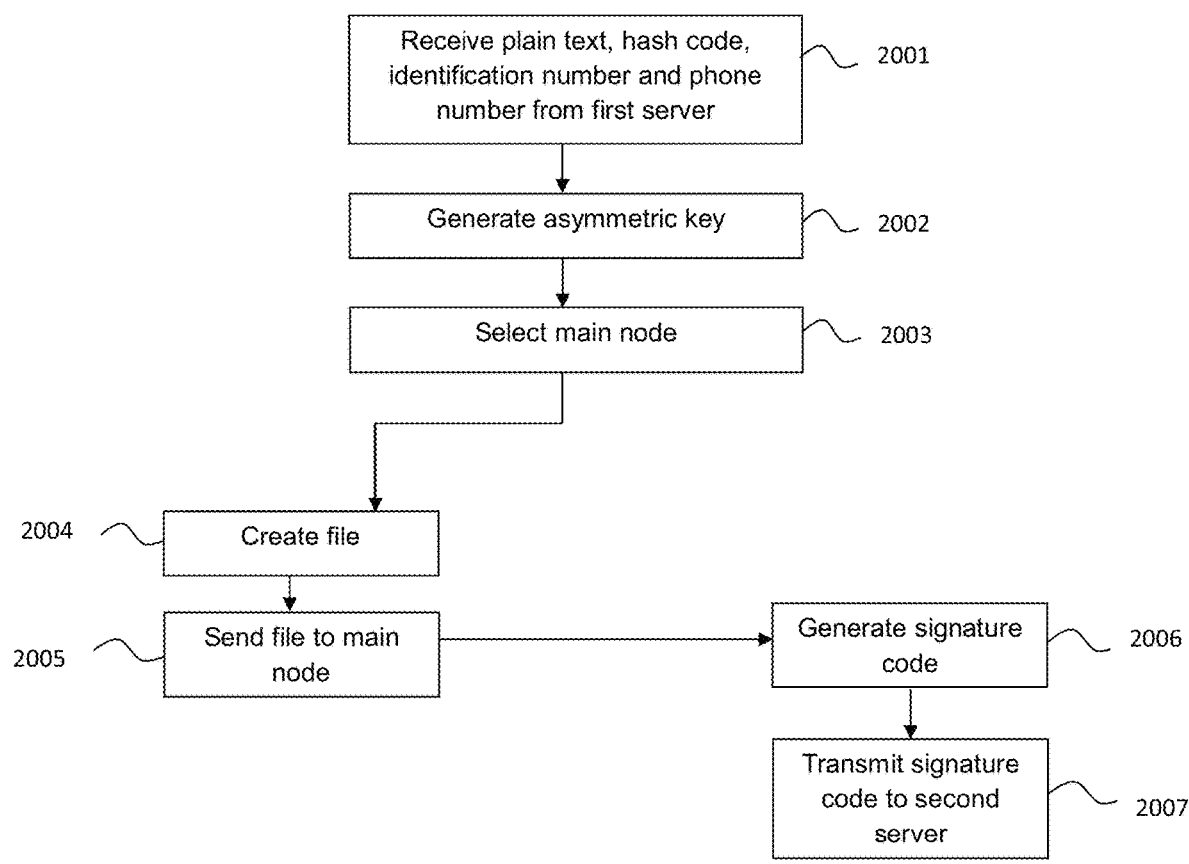
FIG. 2 illustrates a method for issuing an electronic signature, in accordance with one embodiment of the present invention

With reference to FIG. 2, therein it is illustrated an embodiment of a method for issuing an electronic signature. It should be noted that the figure illustrates the steps/actions implemented/executed by the autonomous computing nodes 201-205. At step 2001, each autonomous computing node 201-205 receives the cited information from the first server 100. At step 2002, the autonomous computing nodes 201-205 generate an asymmetric key using its private key. Then, at step 2003, one of the autonomous computing nodes 201-205 is selected as the main autonomous computing node. In some embodiments, this selection is randomly performed. In other embodiments, the last node of the autonomous computing nodes (i.e. node 205 in the embodiment of FIG. 1) is the autonomous computing node that is selected as the main autonomous computing node. In yet other embodiments, the first node is the one that is selected as the main autonomous computing node.

Once the main autonomous computing node 205 is selected, each of the autonomous computing nodes 201-204, create (step 2004) a file of the information it has received. In particular, each autonomous computing node 201-204 extracts the information, or part thereof, creates a code sequence containing a series of alphanumeric characters by means of digitally signing the plain text with its private key, and extracts one or more characters of said created code sequence. Thus, the file contains a modified code sequence that will be later used by the main autonomous computing node 205. At step 2005, the autonomous computing nodes 201-204 send the file to the main autonomous computing node 205.

In some embodiments, the autonomous computing nodes 201-204 can also store the file in a memory thereof or in an associated database. Hence each the autonomous computing node 201-204 can maintain an historic of its transactions.

Then, step 2006, the main autonomous computing node 205, extracts the modified code sequences included in the received files and combines them to create a signature code. Finally, at step 2007, the main autonomous computing node 205 sends the signature code it has created to the second server 300. In some embodiments, the main autonomous computing node 205 can also store the signature code in a memory thereof or in an associated database.

The transmission of the signature code and/or of the files can be done by any messaging application such as a sms, a Voice over IP messaging application (e.g. WhatsApp™, Telegram™, etc.) or an email.

Once the second server 300 has received the signature code, the second server 300, since it has their phone number, can forward the signature code to the user computer device of the signer, in order the latter being able to verify that its digital signature is correct. For instance, the signer can perform said verification by inserting/including/typing the received signature code in the cited web page or software application. If the verification is valid the electronic document is signed.

The examples described above are given by way of illustration of embodiments of the invention. They in no way limit the scope of the invention which is defined by the claims which follow.

The invention claimed is:

1. A method for issuing an electronic signature, the method comprising:

sending, by a first server, information to a second server and to a plurality of autonomous computing nodes of a network, said information including a plain text of an electronic document, a hash code and an identification number of the electronic document, and a phone number of the signer of the electronic document;

generating, by each autonomous computing node, an asymmetric key using a private key of the autonomous computing node;

selecting one of the plurality of autonomous computing nodes as a main autonomous computing node;

creating, by each of the autonomous computing nodes different to said main autonomous computing node, a file of the information it receives by: extracting the information, creating a code sequence comprising a series of characters by digitally signing the plain text with the private key, and extracting at least one character of said created code sequence, providing a modified code sequence;

receiving, by the main autonomous computing node, the file created by the other autonomous computing nodes;

generating, by the main autonomous computing node, a signature code by combining the modified code sequences provided by the other autonomous computing nodes; and transmitting, by the main autonomous computing node, the signature code to the second server, the latter further transmitting the signature code to the signer of the electronic document, whereby the signer can verify that its digital signature is correct by using the received signature code in a web page or software application, wherein upon validation of the digital signature the electronic document is deemed to be signed.

2. The method of claim 1, wherein the series of characters comprise alphanumeric characters.

3. The method of claim 1, wherein the at least one character that is extracted is the last character of the code sequence.

4. The method of claim 1, wherein the extracting step comprises extracting more than one character.

5. The method of any of previous claims claim 1, wherein the main autonomous computing node is randomly selected.

6. The method of claim 1, wherein the selecting step comprises selecting the first or the last node of the plurality of autonomous computing nodes as the main autonomous computing node.

7. The method of claim 1, wherein the created file is further stored in a memory of each autonomous computing node.

8. The method of claim 1, wherein the signature code is transmitted via a sms, a Voice over IP messaging application or an email.

9. A system for issuing an electronic signature, comprising:
   a first server;
   a second server; and
   a plurality of autonomous computing nodes of a network, wherein:
   the first server is configured to send information including a plain text of an electronic document, a hash code and an identification number of the electronic document, and a phone number of the signer of the electronic document to said second server and to said plurality of autonomous computing nodes;
   each autonomous computing node is configured to generate an asymmetric key using its private key;
   one of the autonomous computing nodes is the main autonomous computing node and the others are configured to create a file of the information it receives by: extracting the information; creating a code sequence comprising a series of characters by digitally signing the plain text with the private key; and extracting at least one character of said created code sequence, providing a modified code sequence, and to send the created file to the main autonomous computing node;
   the main autonomous computing node is configured to generate a signature code by combining the modified code sequences provided by the other autonomous computing nodes, and to transmit the generated signature code to the second server, the latter being configured to further transmit the signature code to the signer of the electronic document, whereby the signer can verify that its digital signature is correct by using the received signature code in a web page or software application, wherein upon validation of the digital signature the electronic document is deemed to be signed.

10. The system of claim 9, wherein the plurality of autonomous computing nodes are cloud autonomous computing nodes.

* * * * *